United States Patent [19]

Miyashita et al.

[11] Patent Number: 5,125,773
[45] Date of Patent: Jun. 30, 1992

[54] BORING BAR

[76] Inventors: Kiyoshi Miyashita; Hiroyuki Miyashita, both of 6-10, Shiromidai 4-chome; Yukio Matsumura, 155-2, Suka, Shikama-ku, all of Himeji-shi, Hyogo, Japan

[21] Appl. No.: 785,753

[22] Filed: Oct. 31, 1991

[30] Foreign Application Priority Data

Nov. 2, 1990 [JP] Japan .................. 2-298359
Jul. 29, 1991 [JP] Japan .................. 3-188637

[51] Int. Cl.⁵ .......................................... B23B 51/00
[52] U.S. Cl. ...................................... 408/156; 408/181
[58] Field of Search .............. 408/154, 156, 157, 180, 408/181, 182, 183, 185

[56] References Cited

U.S. PATENT DOCUMENTS

| | | | |
|---|---|---|---|
| 2,266,339 | 12/1941 | Shutz | 408/156 |
| 2,355,965 | 8/1944 | Frishette | 408/156 |
| 4,006,995 | 2/1977 | Gruner | 408/157 |
| 4,606,680 | 8/1986 | Striegl | 408/156 |
| 4,930,957 | 6/1990 | Priessnitz | 408/156 |

Primary Examiner—Daniel W. Howell
Attorney, Agent, or Firm—Wenderoth, Lind & Ponack

[57] ABSTRACT

A boring bar has a body formed with an axial cut at the portion near its tip to define a pair of cut-apart portions. Insert mounting portions are provided on mutually opposite ends of the cut-apart portions at a tip end of the cut. A dimension adjusting mechanism is provided at an intermediate portion of the cut-apart portions. A dimension adjusting mechanism is provided at an intermediate portion of the cut-apart portions to change a boring diameter between the tips of cutting edges of inserts mounted on the insert mounting portions by moving the cut-apart portions along surfaces of the cut. A fixing screw is provided between a tip of the cut-apart portions and the dimension adjusting mechanism to fix the cut-apart portions together after adjusting the dimensions.

In another arrangement, another cut is formed in the bar body at its end opposite from the end on which the inserts are mounted. A covering member is mounted on the bar body to cover this cut. It carries adjusting screws on both sides of the cut to press the bar body in a diametric direction.

4 Claims, 5 Drawing Sheets

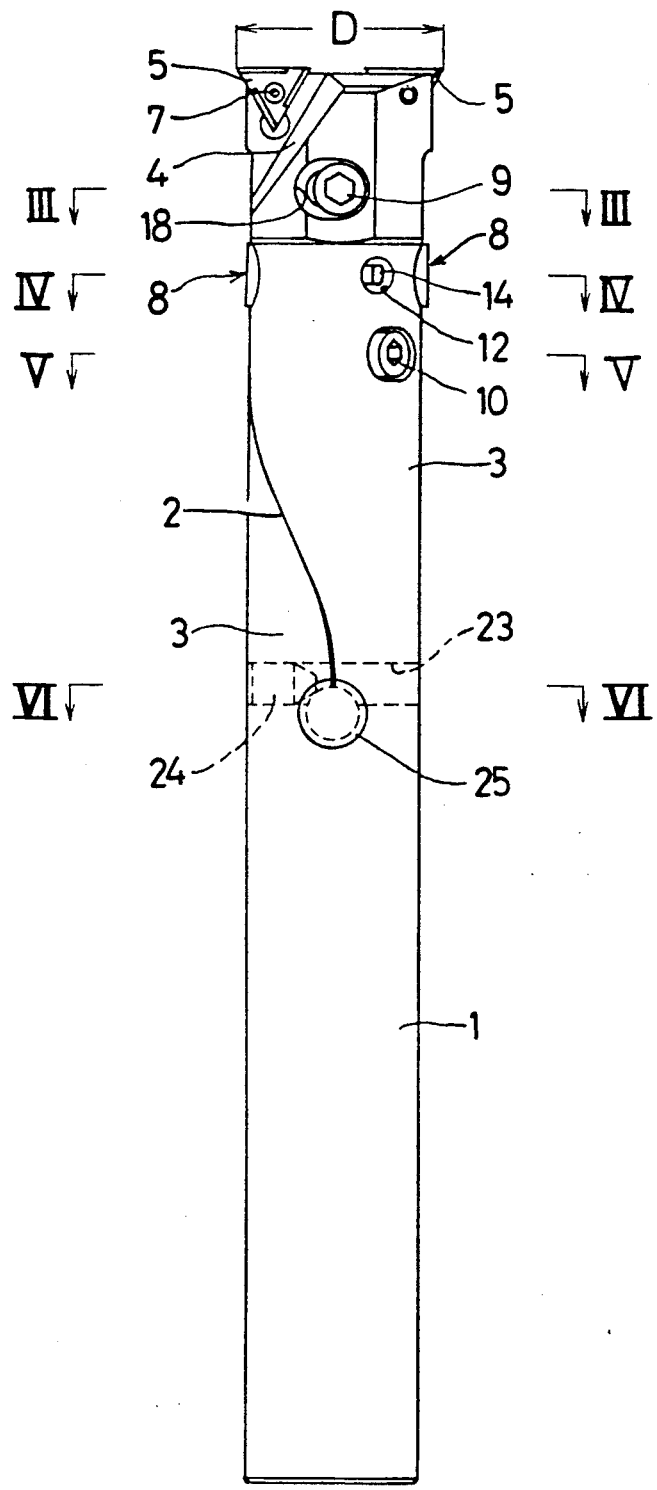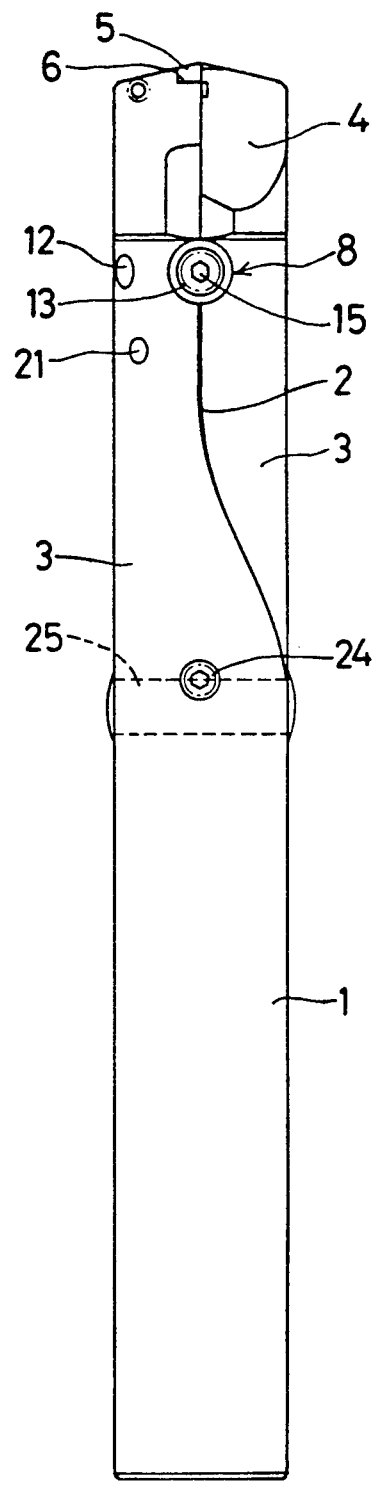

BORING BAR

This invention relates to a boring bar for boring holes in metals and more specifically a boring bar in which the boring diameter is adjustable.

Conventional boring bars adapted to be mounted on milling machines for boring come in two different types, one for precision machining in which a single cutter is mounted on the tip of a boring bar body and the other for rough machining in which two cutters are mounted thereon.

The boring bar for precision machining has problems in that it is difficult to adjust the dimensions because relief tends to appear during cutting and in that high-speed rotation is impossible because of difficulty in keeping the balance and thus the working efficiency is bad.

The boring bar for rough machining can be rotated at high speed because it has two cutters. But it has a problem in that since the adjustments of dimensions and run-out have to be carried out by moving the two cutters individually, such adjustments require a lot of trouble and time. This also lowers the accuracy.

Thus, most of the conventional boring bars were of a single-cutter type.

It is therefore an object of this invention to provide a boring bar which is provided with two cutters at the tip of a boring bar body, in which the adjustments of dimensions and run-out can be carried out easily and with high precision and which permits precise milling machining with the two cutters.

In accordance with the present invention, there is provided a boring bar comprising a bar body formed with an axial cut at a portion near its tip to define a pair of cut-apart portions, the cut-apart portions having insert mounting portions provided on mutually opposite ends thereof, a dimension adjusting means provided at an intermediate portion of the cut-apart portions for changing a boring diameter between the tips of cutting edges of inserts mounted on the insert mounting portions by moving the cut-apart portions along surfaces of the cut, and a fixing screw provided between the tips of the cut-apart portions and the dimension adjusting means for fixing the cut-apart portions together after adjusting dimensions.

In order to change the boring diameter between the tips of the cutting edges of the inserts mounted on the mutually opposite ends of the cut-apart portions, the dimension adjusting mechanism is operated with the fixing screw loosened to forcibly move the cut-apart portions along the surfaces of the cut. By moving them in such a direction that the tips of the inserts are moved away from each other, the boring diameter can be increased. When a predetermined boring diameter is reached, the fixing screw is tightened to fix the cut-apart portions in position.

If the cut-apart portions should run out of true as a result of adjustment of the boring diameter, such run-out can be corrected by moving the tips of the cut-apart portions by operating the run-out adjusting screw.

In another arrangement, if it is desired to reduce vibration or to change the boring diameter after the bar body is mounted on a chuck of a milling machine, this is carried out by tightening the adjusting screws mounted on the covering member fitted on the bar body.

In adjusting vibration and the boring diameter, one of the adjusting screws which is located on the side toward which the tips of the inserts are desired to be moved is threaded in. By threading the screw, it presses against the outer peripheral portion of the bar body facing the cut, so that the tip of the bar body is bent toward the adjusting screw being pressed due to the effect of the cut formed in the bar body. The vibration can be reduced or the boring diameter can be changed by changing the amount of this bending.

According to this invention, inserts are mounted on mutually opposed ends of the cut-apart portions defined by the cut at the tip of the cut surfaces. A dimension adjusting mechanism is provided to move the cut-apart portions in the direction of the cut surfaces. Thus, both inserts can be moved simultaneously in adjusting the boring diameter, so that the boring diameter can be adjusted and changed easily and accurately and the device can cope with a wider range of boring diameter.

Further, since the inserts are mounted at both sides, the parallelism of cutting is high with no relief. Also, since the boring diameter and run-out can be measured and the balance can be maintained, high-speed rotation is possible. This makes possible boring with high roundness. Thus, precision milling operation can be carried out at double the feed speed. This increases the efficiency of operation.

Further, since the boring bar body is integrally formed, its rigidity is high. Thus, the inserts can be opened and closed uniformly with respect to each other and adjustment can be made with high precision. Any run-out can be corrected reliably.

Other features and objects of the present invention will become apparent from the following description taken with reference to the accompanying drawings, in which:

FIG. 1 is a front view of the first embodiment of the boring bar according to this invention;

FIG. 2 is a side view of the same;

Figure 3:
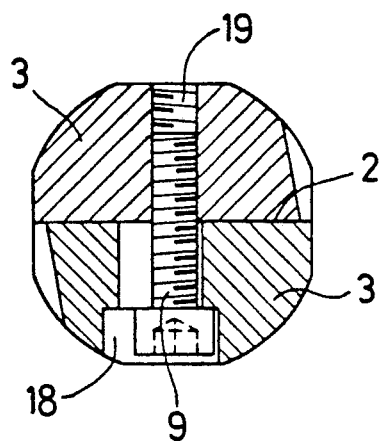
FIG. 3 is an enlarged cross-sectional view taken along line III—III of FIG. 1.

Now the embodiments of this invention is described with reference to the accompanying drawings.

In FIGS. 1-6, a boring bar body 1 has an axial cut 2 passing its axis and is provided with a pair of cut-apart portions 3 at both sides of the cut 2.

The cut-apart portions 3 are provided on the tips thereof with inclined cutouts 4 at opposite sides from each other. Recesses 6 for mounting inserts 5 are formed in the end of the cut surfaces so as to be located opposite to the cutouts 4. The inserts 5 are mounted in the recessed mounting portions 6 and fixed in position with screws 7.

The inserts 5 are fixed to the cut-apart portions 3 at their ends remote from each other and have their cutting edges protruding outwardly from the outer periphery of the boring bar body 1. The distance between the tips of the cutting edges of the inserts 5 corresponds to the boring diameter D.

A dimension adjusting mechanism 8 is mounted in an intermediate portion of the cut-apart portions 3 change the boring diameter between the tips of the insert edges. A fixing screw 9 is provided at the side near the tip and a locking screw 10 at the side remote from the tip, with the adjusting mechanism 8 disposed therebetween.

Figure 4:
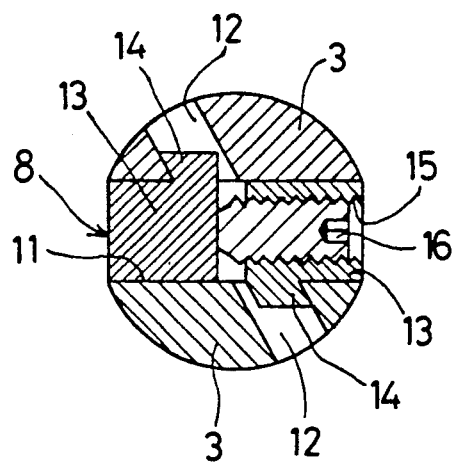
FIG. 4 is an enlarged cross-sectional view taken along line IV—IV of FIG. 1.

FIG. 4 shows a first example of the dimension adjusting mechanism 8. The cut-apart portions 3 are formed in the opposed surfaces thereof with a lateral hole 11 which overlaps with the cut 2 and with an oblique hole 12 extending therethrough and crossing the lateral hole 11 at the center. A pair of adjusting members 13 are inserted into the lateral hole 11 at both ends thereof. One of the adjusting members 13 is provided with an engaging claw 14 protruding from the outer surface thereof and engaged in the oblique hole 12 formed in one of the cut-apart portions 3. The other adjusting member 13 also has an engaging claw 14 protruding from the outer surface thereof and engaged in the oblique hole 12 formed in the other cut-apart portion 3. An adjusting screw 16 is threaded in a threaded hole 15 formed in one of the adjusting members 13 and has its tip in abutment with the end face of the other adjusting member 13.

In case of the adjusting mechanism of the first example, as the adjusting screw 16 is threaded in, the cut-apart portions 3 are pushed apart along the surfaces of the cut 2 through the adjusting members 13. Thus, the distance between the tips of the cutting edges of the inserts 5 and thus the boring diameter D can be changed.

Figure 7:
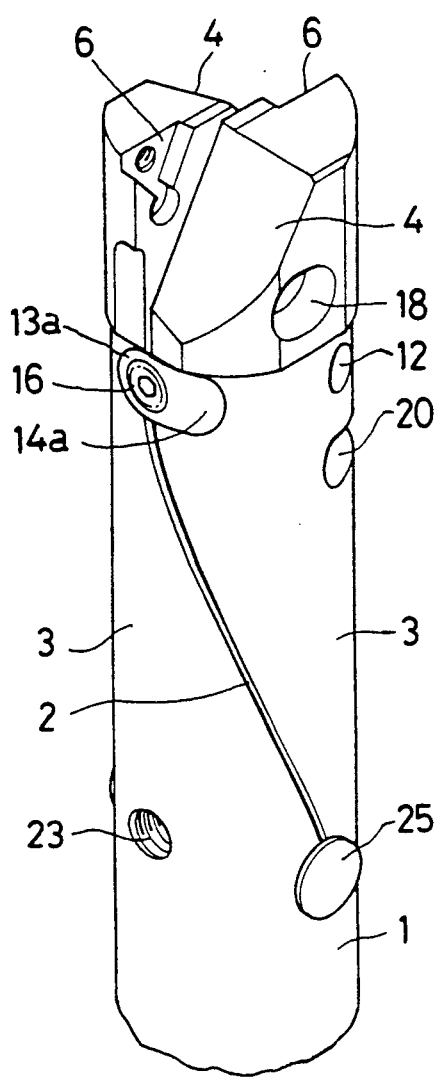
FIG. 7 is a perspective view of the structure at the tip of a boring bar body provided with a second embodiment of the dimension adjusting mechanism.
Figure 8:
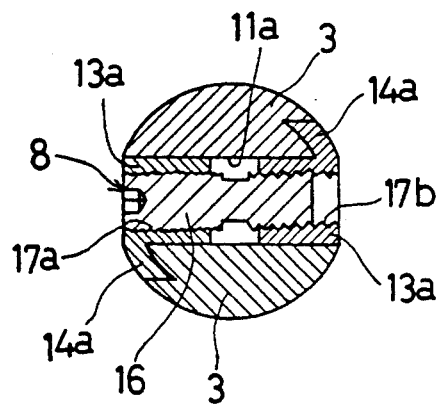
FIG. 8 is a cross-sectional view of the same.
Figure 9:
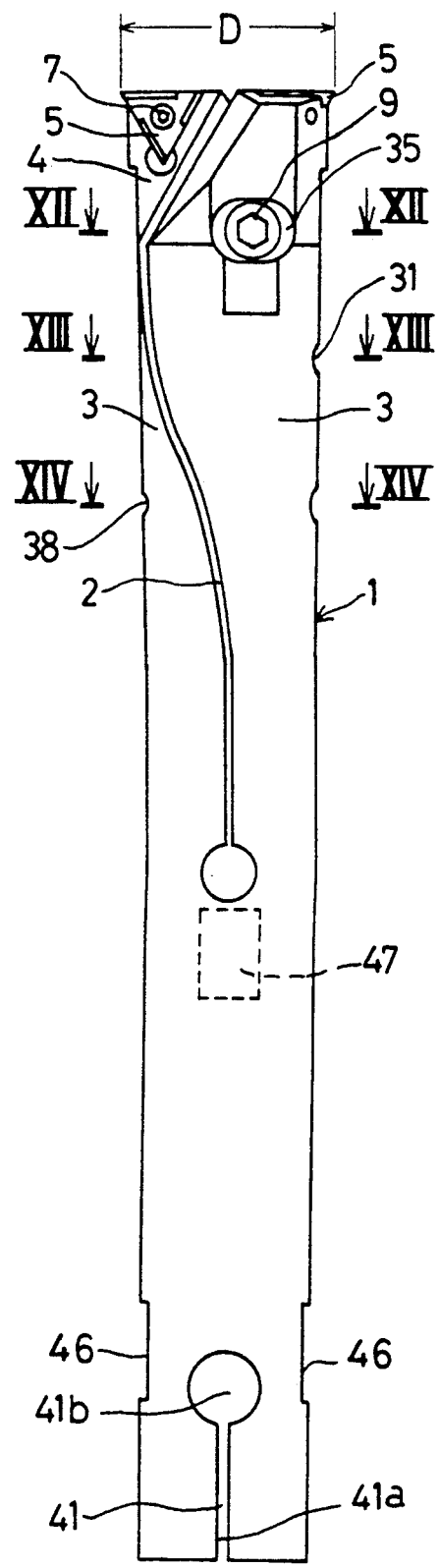
FIG. 9 is a view similar to FIG. 1 of a second embodiment of the boring bar according to the invention.
Figure 10:
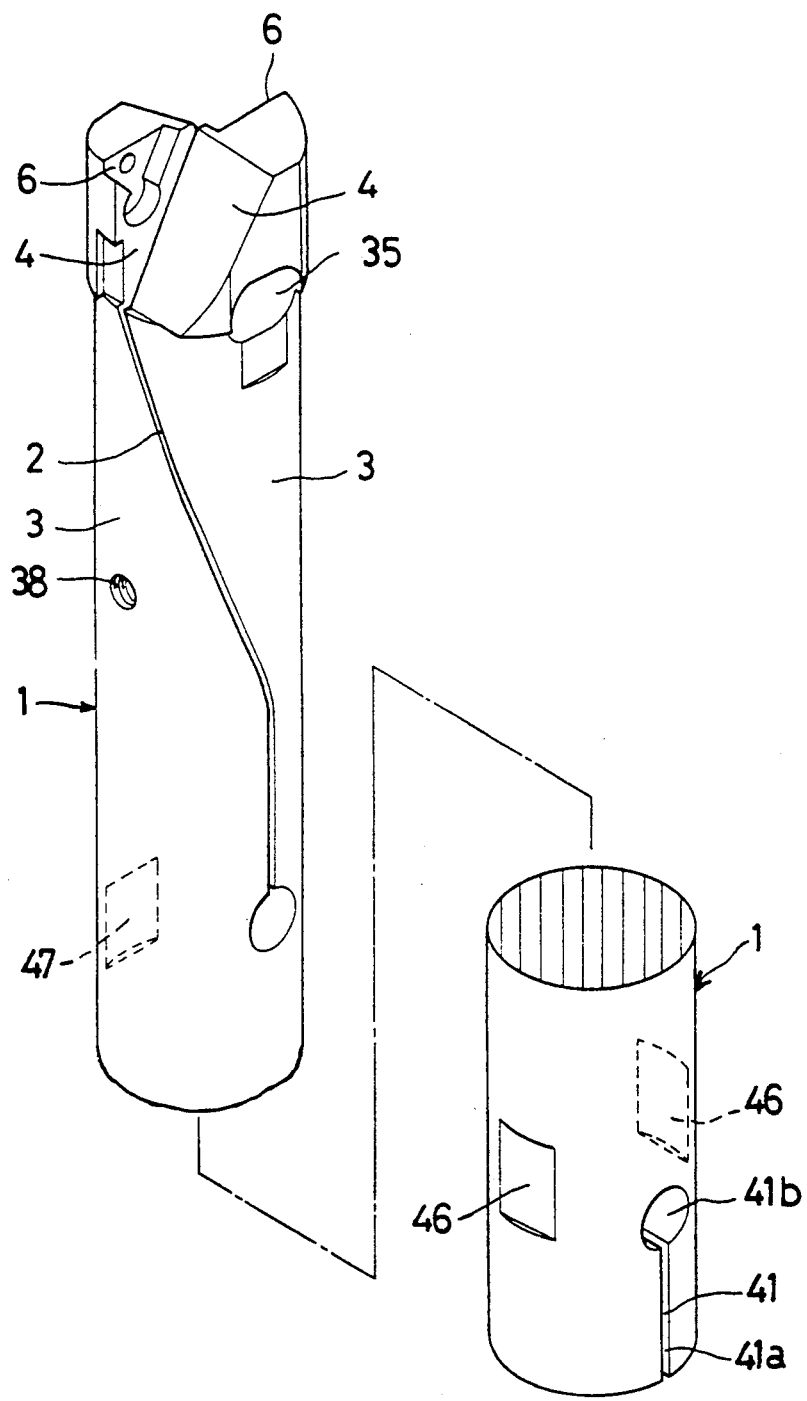
FIG. 10 is an exploded perspective view thereof.
Figure 11:
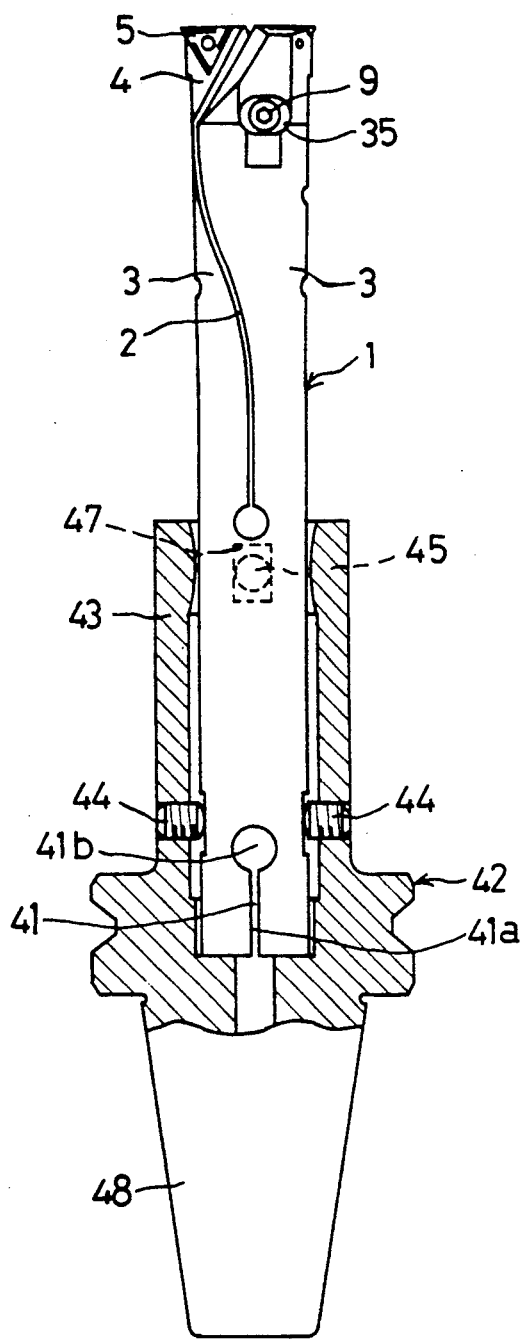
FIG. 11 is a sectional elevation view of the holder with the boring bar of this embodiment therein.

Next, in the second example of the dimension adjusting mechanism shown in FIGS. 7 and 8 a lateral hole 11a is formed to extend over the opposed surfaces of the cut-apart portions 3 and to overlap with the cut 2. A pair of adjusting sheaths 13a and 13b are inserted in the lateral hole 11a at both ends thereof. One of the adjusting sheaths 13a is provided with an engaging claw 14a protruding from the outer end thereof and engaging the outer surface of one of the cut-apart portions 3. The other adjusting sheath 13a also has an engaging claw 14a protruding from the outer end thereof and engaging the outer surface of the other cut-apart portion 3. The adjusting sheaths 13a are coupled together through an adjusting screw 16 threaded into both members.

As shown in FIG. 8, the adjusting screw 16 has male threads 17a having a small pitch and male threads 17b having a large pitch. One of the adjusting sheaths 13a is in threaded engagement with the male threads 17a having a small pitch while the other adjusting sheath 13a is threaded on the male threads 17b having a large pitch.

By turning the adjusting screw 16, the adjusting sheaths 13a move in the same direction but at different rates due to the difference in pitch between the male threads 17a and 17b.

Due to this difference in movement, when the adjusting screw 16 is turned either clockwise or counterclockwise, the adjusting screws 13a move toward or away from each other. When the adjusting sheaths 13a move away from each other, the cut-apart portions 3 are pushed apart along the surfaces of the cut 2 by the adjusting sheaths 13a. This changes the distance between the tips of the cutting edges of the inserts 5 and thus the boring diameter D.

As shown in FIG. 3, the fixing screw 9 extends through a stepped elongated hole 18 formed in one of the cut-apart portions 3 and is threaded in a threaded hole 19 formed in the other cut-apart portion 3. The cut-apart portions 3 are tightened together by tightening the fixing screw 9 so that the surfaces of the cut 2 overlap.

Figure 5:
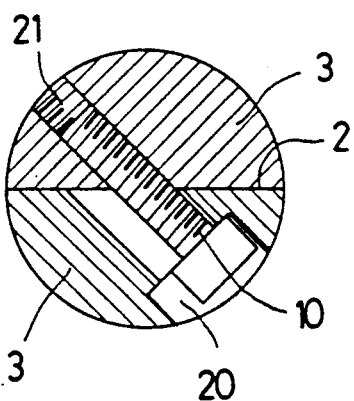
FIG. 5 is an enlarged cross-sectional view taken along line V—V of FIG. 1.

As shown in FIG. 5, the locking screw 10 extends at an angle of 45 degrees with respect to the cut 2 through an elongated hole 20 formed in one of the cut-apart portions 3 and are threaded in a threaded hole 21 formed in the other cut-apart portion 3, thereby tightening the cut-apart portions 3 so as not to be movable along the surfaces of the cut 2.

Figure 6:
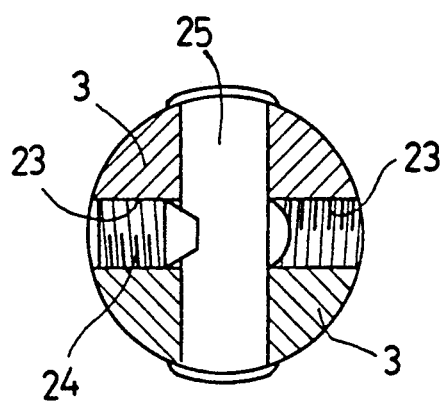
FIG. 6 is an enlarged cross-sectional view taken along line VI—VI of FIG. 1.

As shown in FIG. 6, the cut-apart portions 3 are formed in the rear ends thereof with threaded holes 23 extending perpendicular to the cut 2. A run-out adjusting screw 24 is threaded into one of the threaded holes 23.

A round shaft 25 extends through the boring bar body 1 along the surfaces of the cut 2 crossing the threaded holes 23. The run-out adjusting screw 24 has its tip abutting the round shaft 25.

When the run-out adjusting screw 24 is tightened while kept in abutment with the round shaft 25, either of the cut-apart portions 3 will move apart at the root thereof from the round shaft 25 and at the tip thereof in the opposite direction, thereby correcting any run-out of the cut-apart portions 3 with respect to the boring bar 1.

Since the boring bar 1 has its cut-apart portions 3 twisted by 90 degrees, they can move smoothly in the direction of adjustment of the boring diameter and the dimension adjusting screw 16 can be controlled easily. Further, since the cut-apart portions 3 are twisted in such a direction that the inserts are located rearward of the bottom end of the cut 2 with respect to the direction of rotation of the boring bar during cutting, the mass of repulsion is small. This serves to reduce vibration.

The boring diameter D between the tips of the cutting edges of the inserts 5 is minimum when the adjusting members 13 of the dimension adjusting mechanism 8 are the nearest to each other, i.e. when the cut-apart portions 3 are at rest and not subjected to such a force as to push them apart.

When in this state the cut-apart portions 3 are fixed together by tightening the fixing screw 9 and the locking screw 10, a hole having a minimum diameter can be bored.

In order to increase the boring diameter, the adjusting screw 16 is turned in such a direction that the adjusting members 13 move away from each other, with the fixing screw 9 and the locking screw 10 loosened.

As the adjusting members 13 move away from each other, the cut-apart portions 3 are pushed open in both directions along the cut 2 by the engaging claws 14 of the adjusting members 13. Thus, the distance between the tips of the inserts 5 increases.

The distance between the tips of the insert 5 is measured with a micrometer and when a predetermined boring diameter D is reached, the fixing screw 9 and the locking screw 10 are tightened to secure the cut-apart portions 3 together. Thus, a hole having a predetermined diameter can be bored.

If, after setting the boring diameter, the cut-apart portions 3 should run out of true while in rotation, the run-out adjusting screw 24 is threaded into the threaded hole 23 provided at the root of the cut-apart portion 3 located opposite to the direction of run-out until its tapered tip abuts the round shaft 25.

This causes the tips of the cut-apart portions 3 to move in a direction opposite to the direction of run-out, thus eliminating run-out.

Now the second embodiment of this invention is described with reference to FIGS. 9-14.

As shown in the drawings, a cylindrical bar body 1 is formed with an axial cut 2 crossing the axis of the shank and extending from its tip end to its intermediate portion. A pair of cut-apart portions 3 are defined at both sides of the cut 2.

The cut-apart portions 3 are provided with tapered cutouts 4 in their tip ends at locations remote from each other. Recesses 6 for mounting inserts 5 are formed in the ends of the cut-apart portions 3 at locations opposite the cutouts 4. The inserts 5 set in the recessed mounting portions 6 are secured in position by screws 7.

The inserts 5, which are fixed in position at opposite ends from each other, protrude outwardly beyond the outer periphery of the bar body 1. The distance between the tips of the edges of the inserts 5 corresponds to the boring diameter D.

A dimension adjusting mechanism 8 (FIG. 13) is provided at an intermediate portion of the cut-apart portions 3. It serves to change the boring diameter between the tips of the insert edges. A fixing screw 9 and a locking screw 10 are provided on both sides of the adjusting mechanism 8, the former being near to the tip and the latter remote from the tip.

Figure 13:
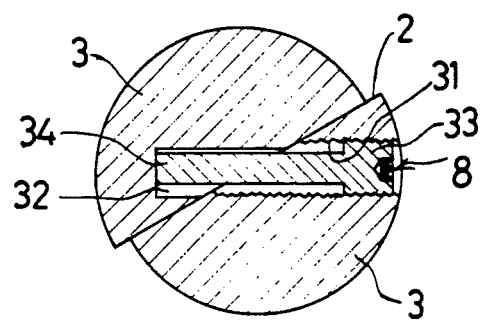

As shown in FIG. 13, the dimension adjusting mechanism 8 has a threaded hole 31 formed in one of the cut-apart portions 3 to extend obliquely with respect to the cut 2 from its outer periphery toward the center of the cut 2, and a bottom-closed hole 32 formed in the other cut-apart portion 3 which extends at the same angle of inclinations as the hole 31 and opens to the center of the cut 2. An adjusting screw 33 is threaded in the threaded hole 31. It is integrally provided with a shaft 34 which is inserted in the hole 32. By threading the screw 33 in, the tip of the shaft 34 abuts the bottom of the hole 32, imparting the cut-apart portions 3 a force to separate them from each other. This causes change in phase between the cut-apart portions 3, which in turn changes the distance between the tips of the edges of the inserts 5 and thus the boring diameter D.

Figure 12:
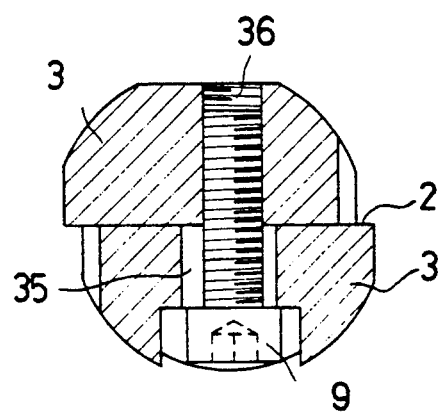
FIGS. 12-14 are transverse sectional views taken along lines XII—XII through XIV—XIV of FIG. 9.

As shown in FIG. 12, the fixing screw 9 extends through an elongated stepped hole 35 formed in one of the cut-apart portions 3 and is threaded in a threaded hole 36 formed in the other cut-apart portion 3. It is tightened up after adjusting the boring diameter D until the opposed surfaces of the cut 2 overlap each other.

Figure 14:
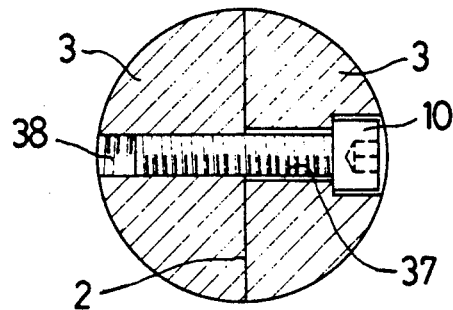

As shown in FIG. 14, the locking screw 10 extends, at a right angle with respect to the cut 2, through a hole 37 formed in one of the cut-apart portions 3 and is threaded in a threaded hole 38 formed in the other cut-apart portion 3. It is tightened up to prevent the cut-apart portions 3 from moving along the surfaces of the cut 2.

The boring bar of this embodiment has its cut-apart portions 3 twisted by 90° in the same manner as in the first embodiment.

The shank 1 is formed in its root end portion with a cut 41 (FIGS. 9-11) which extends at a right angle with respect to the direction of movement of the inserts 5. A holder 42 (FIG. 11) as a covering member has its cylindrical portion 43 fitted on the shank 1 at its root portion.

The cylindrical portion 43 carries adjusting screws 44 on both sides of the cut 41 and a fixing screw 45 provided at the top end of the holder 42 and adapted to press and hold the shank 1 in position from the direction perpendicular to the direction of the adjusting screws 44. The portions of the shank 1 where the adjusting screws 44 and the fixing screw 45 abut are formed flat as at 46 and 47.

The cut 41 formed in the bar body 1 comprises a straight portion 41a and a circular hole 41b formed at the inner end of the straight portion 41a. The circular hole 41b is located offset toward the root of the bar body 1 with respect to the line that connects the axes of the adjusting screws 44 to maintain a sufficient rigidity of the bar body 1. The cylindrical portion 43 of the holder 42 holds the shank 1 at the tip and the inner end of the inner periphery thereof. At the intermediate portion, a gap is formed between the inner periphery of the portion 43 and the bar body 1.

In the illustrated example, the holder 42 has the cylindrical portion 43 and a tapered portion 48 and is held by a chuck of a milling machine. But the covering member may be a mere cylindrical member.

The boring diameter D between the tips of the edges of the inserts 5 is minimum when the dimension adjusting screw 33 of the dimension adjusting mechanism 8 is kept out of the hole 32, i.e. when the cut-apart portions 3 are at rest and not subjected to a force to push them apart.

In this state, by tightening the cut-apart portions 3 together by tightening up the fixing screw 9 and the locking screw 10, a hole having a minimum diameter can be bored.

In order to increase the boring diameter, the screw 33 is threaded in with the fixing screw 9 and the locking screw 10 loosened to push open the cut-apart portions 3 along the cut 2 as shown in FIG. 13.

The distance between the tips of the inserts 5 is measured with a micrometer and when a predetermined boring diameter D is reached, the fixing screw 9 and the locking screw 10 are tightened up to tighten the cut-apart portions 3 together. Thus, a hole having a predetermined diameter can be bored.

If, after setting the boring diameter, the cut-apart portions 3 should run out of true while in rotation, one of the adjusting screws 44 threaded in the holder 42, that is, the one provided opposite to the direction of run-out, is tightened up to press the bar body 1.

Since the bar body 1 is pressed at its outer upper portion opposite the cut 41, the cylindrical portion 43 is pressed at its intermediate portion, with its tip and inner end as support points. As a result, due to the presence of the cut 41, the bar body 1 yields so that the tip of the bar body 1 moves about an urging-fixing point at the tip of the cylindrical portion 43 in the direction opposite to the direction of run-out. Thus, the run-out can be corrected.

In the illustrated example, the boring bar carries two inserts and the boring diameter of both inserts is adjusted by adjusting the distance between the inserts. But the boring bar may carry a single insert. In this case, the adjusting screws 44 threaded in the holder 42 are used to adjust the boring diameter.

What is claimed is:

1. A boring bar comprising a bar body formed with an axial cut at a portion near its tip to define a pair of cut-apart portions, said cut-apart portions having insert mounting portions provided on mutually opposite ends thereof, a dimension adjusting means provided at an intermediate portion of said cut-apart portions for changing a boring diameter between the tips of cutting edges of inserts mounted on said insert mounting portions by moving said cut-apart portions along surfaces of said cut, and a fixing screw provided between the tips of said cut-apart portions and said dimension adjusting means for fixing said cut-apart portions together after adjusting dimensions.

2. A boring bar as claimed in claim 1, wherein said cut-apart portions are twisted by a predetermined angle.

3. A boring bar as claimed in claim 1 or 2, further comprising a run-out adjusting screw adapted to be threaded into rear ends of said cut-apart portions to move tip ends of said cut-apart portions.

4. A boring bar as claimed in claim 1 wherein said bar body is formed with another cut in the end thereof opposite from the end on which said inserts are mounted, said another cut extending through said bar body in a diametric direction perpendicular to the direction in which the cutting edges of said inserts move, and further comprising a covering member mounted on said bar body to cover said another cut, said covering member carrying adjusting screws on both sides of said another cut to press said bar body in a diametric direction.

* * * * *